United States Patent [19]

Karlsson

[11] 4,223,854
[45] Sep. 23, 1980

[54] MULTIPLIER FISHING REEL WITH A LEVEL-WIND

[75] Inventor: Jarding U. Karlsson, Svängsta, Sweden

[73] Assignee: ABU Aktiebolag, Sweden

[21] Appl. No.: 961,907

[22] Filed: Nov. 20, 1978

[30] Foreign Application Priority Data

Nov. 28, 1977 [SE] Sweden .................................. 7713420

[51] Int. Cl.³ ...................... A01K 89/02; A01K 89/04
[52] U.S. Cl. ................................... 242/213; 242/218; 242/221
[58] Field of Search .............. 242/84.42, 84.41, 84.43, 242/84.4, 211, 212, 213, 214, 215, 216, 217, 218, 219, 220, 221

[56] References Cited

U.S. PATENT DOCUMENTS

| | | | |
|---|---|---|---|
| 1,212,288 | 1/1917 | Upton | 242/84.42 |
| 1,345,072 | 6/1920 | Case | 242/84.42 X |
| 2,380,670 | 7/1945 | Nelson | 242/84.42 |
| 2,463,108 | 3/1949 | Jacobson | 242/216 |
| 2,859,924 | 11/1958 | Sarah | 242/212 X |
| 3,429,521 | 2/1969 | Jones | 242/220 |

Primary Examiner—Billy S. Taylor
Attorney, Agent, or Firm—Karl W. Flocks

[57] ABSTRACT

A multiplier fishing reel, in which the line spool may be rotated in a first direction by means of the fishing line during a cast, and may be rotated in the opposite direction by means of a hand crank for retrieval of the line onto the spool comprises a first transmission between the crank and the line spool for rotating the line spool by means of the crank, a first clutch between the line spool and the first transmission for manual disengagement of the line spool from the first transmission for casting, and an adjustable frictional clutch which comprises two relatively rotatable elements of the first transmission, whereby the line spool may be rotated against the action of friction from the frictional clutch in relation to the hand crank by tractive force from the line even when the first coupling is engaged. The fishing reel is further equipped with another clutch which permits release of the line spool also from the level-wind mechanism of the reel which is driven by the hand crank via the second transmission whereby the line spool becomes free-running during a cast and the level-wind mechanism remains motionless.

9 Claims, 7 Drawing Figures

FIG.1

MULTIPLIER FISHING REEL WITH A LEVEL-WIND

The present invention relates to a multiplier fishing reel having a frame, a line spool rotatably mounted in the frame, the line spool being rotatable in a first direction by tractive force from the fishing line when the fishing line is drawn out from the line spool, a crank and a first transmission means between the crank and the line spool for rotating the latter in the opposite direction for retrieving the fishing line onto the line spool, a level-wind mechanism for laying the line on the line spool during retrieval of the line, second transmission means between the line spool and the level-wind mechanism for driving the latter when the line spool is rotated by means of the crank, means between the first transmission and the line spool for disengaging the line spool during a cast, and an adjustable frictional clutch means including a pair of relatively rotary and axially adjustable elements of the first transmission means for permitting rotation of the line spool in relation to the crank in the first direction by tractive force from the fishing line.

It is known in the art to provide multipliers with a mechanically acting device for releasing the spool from the crank mechanism in order to make for greater casting lengths. Moreover, it is also known in the art to provide multipliers, for the same purpose, with a device for mechanical release of the level-wind so that it is motionless during the cast. However, the prior art constructions for release of the level-wind are mechanically complicated and sensitive and have not, therefore, come into general use, tending rather to disappear from the market.

The major aspect of the present invention is to realize a multiplier having a relatively simple, functionally reliable level-wind mechanism which permits automatic release of the line from the level-wind during a cast and automatically captures the line on retrievel of the line. A second aspect of the present invention is to combine a level-wind mechanism constructed in this manner with a simple, functionally reliable device for automatic release of the level-wind.

With these and other aspects in view, the invention consists in the construction, arrangement and combination of the various parts of the multiplier, whereby the aspects contemplated are attained, as hereinafter more fully set forth and pointed out in the claims, and illustrated in the accompanying drawings, in which:

Figure 1:
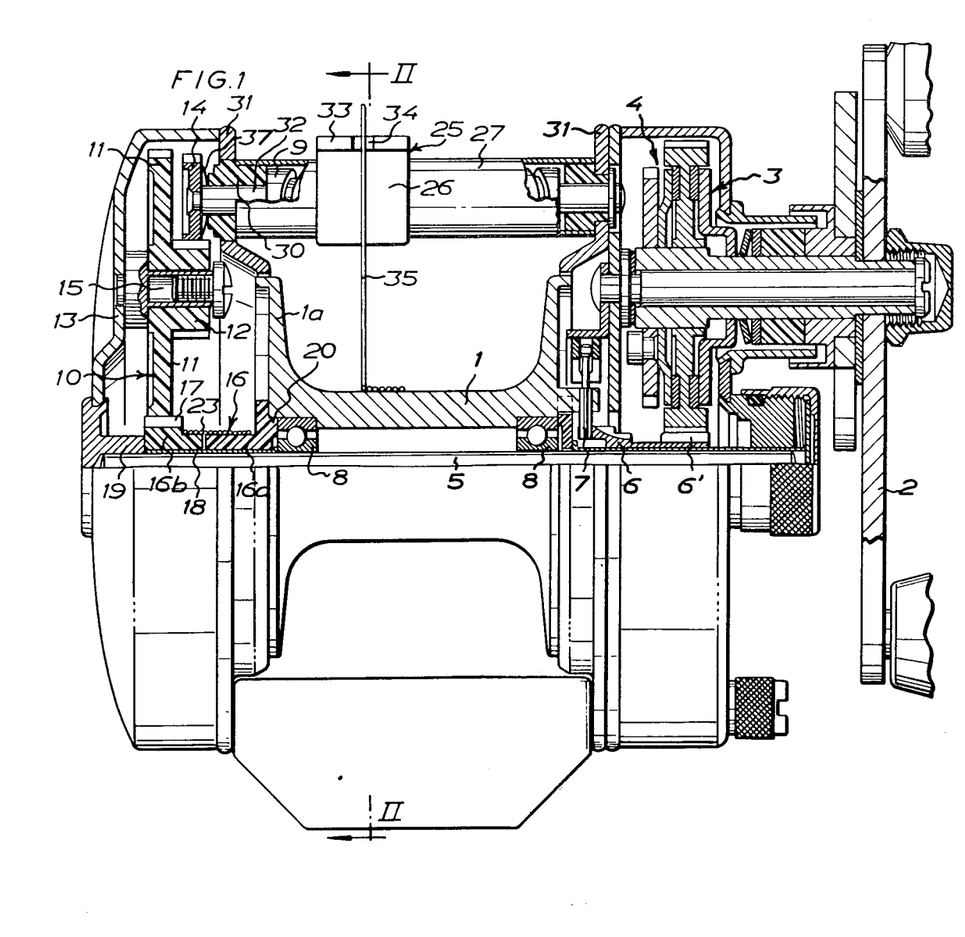
FIG. 1 shows a preferred embodiment of a multiplier according to the invention, half of the figure being in side elevation and the other in axial section.

The multiplier shown in FIG. 1 is of known basic construction in which the line spool 1 is driven by means of the crank 2 by the intermediary of a transmission which comprises a sliding clutch and gears which are generally designated 3 and 4, respectively, and a clutch 6 which is shiftably guided on the shaft 5 of the line spool 1, this shaft being axially adjustable but otherwise fixed. The clutch 6 is designed integrally with a gear wheel 6' and is shiftable by means of a clutch mechanism in a direction to the right with respect to FIG. 1 for release of the clutch 6 from a clutch portion 7 on the right-hand end wall of the line spool 1, and thus, for release of the line spool from the crank transmission. During the shifting movement of the clutch 6, the gear wheel 6' retains its engagement with a gear wheel which is included in the crank transmission and in relation to which the gear wheel 6' is shiftable.

In a well-known multiplier construction, the involute screw 9 of the level-wind is driven by the line spool 1 by the intermediary of a gear consisting of a gear drive mounted on the left end wall 1a of the line spool 1 (or the end wall of the line spool most distal from the crank) and driving, via an intermediate gear wheel, a small gear wheel 14 on the left-hand end of the involute screw 9. The embodiment shown in FIG. 1 belongs to this major category of multipliers but has, according to the invention, an automatically-operating release mechanism in the transmission between the line spool and the level-wind.

The intermediate gear wheel set which, in FIG. 1, is generally designated 10, may in a known manner be in the form of a unit which consists of one larger and one smaller gear wheel, 11 and 12, respectively, and is journalled on a cantilevered shaft 15 mounted on the left-hand outer end wall housing 13 of the multiplier. The smaller gear wheel 12 engages with the gear wheel 14 fixed to the left-hand end of the involute screw 9.

In the embodiment shown in FIG. 1, line spool 1 is operative to drive the intermediate gear set 10 by the intermediary of a clutch, generally designated 16, which comprises two clutch portions 16a, 16b, of which the one clutch portion 16b supports a gear drive 17 which is in mesh with the large gear wheel 11 of the gear set 10.

Both of the clutch portions 16a, 16b consists of two sleeves which are journalled on a slide bearing bushing 18 fixedly disposed on the one spool shaft 5. This bushing is, at the same time, in the form of a spacer sleeve between the inner ring, fixedly connected to the non-rotary spool shaft 5, of adjacent ball bearings 8 for journalling the spool 1 on the shaft 5, and the end of a sleeve 19 connected to the end wall housing 13, in which sleeve the end of the spool shaft 5 is inserted.

Figure 3:
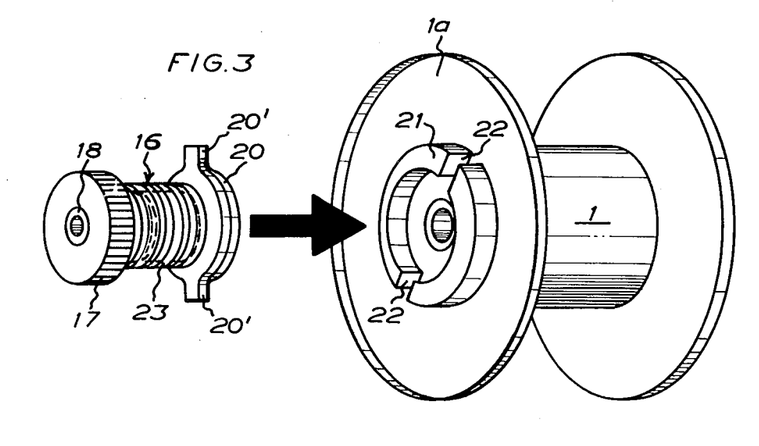
FIG. 3 is a perspective view of the line spool seen from the left in FIG. 1 and shows the release mechanism for the level-wind in position for assembly with the line spool.

As is shown in FIG. 3, the one clutch portion 16a has a radial end flange 20 with two radial, diametrically opposed projections 20'. The left-hand end wall 1a of the line spool 1 has an annular, axial projection 21 which displays two recesses 22. The flange 20 and flange projections 20' of the clutch portion 16a may, on assembly, easily be inserted into the ring 21 on the spool flange 1a so that the flange projections 20' are brought into engagement with the recesses 22 (please see FIG. 1).

A helicoidal, preferably flat, clutch spring 23 is disposed on each clutch portion 16a, 16b, the spring resting with slight friction against the outer peripheral surfaces of the two clutch portions 16a, 16b. This arrangement forms a per se known one-way clutch which, on rotation of the line spool 1 by means of the crank 2, drives the level-wind by the intermediary of the gear wheels 17, 11, 12, 14. When the crank is turned in the direction intended for retrival of the line, the spring 23 is immediately tightened about and couples the portions 16 and 16a and the arrangement realizes automatic release of the clutch portion 16a from the clutch portion 16b (and thus from the level-wind transmission) when the line spool is rotated by the tractive force from the line during a cast.

Thus, during a cast, the entire transmission for the level-wind mechanism, counted from the clutch portion 16b, is immediately released whereby the line spool will, during the cast, run as freely as possible and, when the crank is used for retrieval of the line after a cast, the level-wind is immediately reengaged as the clutch spring 23 is tightened.

The level-wind according to the invention, generally designated 25, comprises, in a conventional manner, a carriage 26 (please see, in particular FIGS. 2 and 4) which, for reciprocal movement in the axial direction of the involute screw 9, is shiftably guided on a guide tube 27 which surrounds the involute screw 9 but has an axial slot 28 (please see FIG. 4) through which a coupling pin 29 supported on the carriage extends to the involute screw with whose thread the wedge-shaped end of the pin engages. On retrieval of the line by means of the crank 2, the involute screw 9 is rotated by the intermediary of the above-described transmission and reciprocally drives, in a per se known manner, the carriage 26, the level-wind pawl 33 mounted on the carriage realizing the desired distribution of the line and criss-cross laying of the line coils on the line spool.

Figure 4:
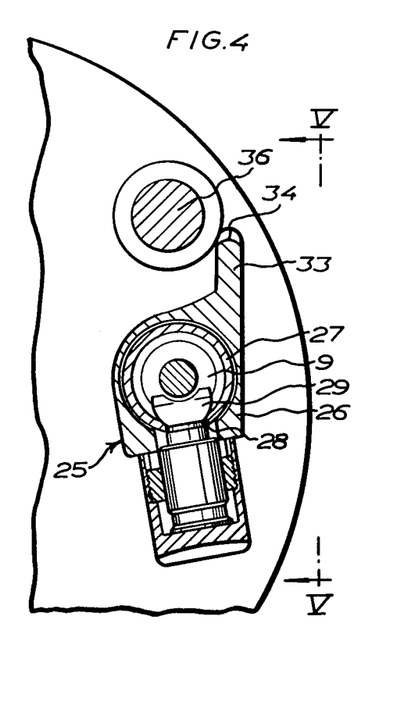
FIG. 4 shows details of the level-wind of FIG. 2 or of the section IV—IV in FIG. 6 on a larger scale.

The guide tube 27 is supported at its ends on bearing sleeves 30 which consist, for example, of nylon and are mounted in the inner end walls 31 of the multiplier frame and in which the stub shafts of the involute screw 9 are journalled.

As opposed to conventional constructions in which the pawl mounted on the level-wind carriage 26 is in the form of a steel wire inverted U-member, the illustrated pawl 33 consists of a plate with an open guide groove 34 in which the line 35 normally runs during retrieval. As will be apparent from the following explanation, the level-wind pawl is arranged to be released from the line during cast and to pick up the line again when retrieval of the line is commenced. During retrieval of the line, the line is kept taught in that it runs, from the guide groove 34 of the level-wind pawl 33, to the line spool 1 under a transverse, round, smooth bar 36 (please see FIG. 5) which, at its ends, is connected to the multiplier frame end walls 31 and against which the line is caused to form a bend in the distance from the line spool to the level-wind pawl 33. In order to reduce the sliding friction of the line 35 against the bar 36, the bar is very smooth and hard chromium-plated.

The carriage 26, shiftably guided on the guide tube 27, is disposed to reciprocally rotate through a restricted angle in order to permit pivoting away of the level-wind pawl 33 from engagement with the line 35 during a cast and returning the pawl 33 on retrieval of the line. For this purpose, the carriage 26 could be pivotally disposed on the guide tube between pivot arrest stops, in which case a minor amount of friction between the coupling pin and the involute screw may be utilized for realizing the necessary torque for returning the carriage after it has been swung away during the cast (in which case the line and inertia forces are utilized for this swinging away movement). However, in the illustrated preferred embodiment, the guide tube 27 is arranged so as to be rotatable through a restricted angle reciprocally on the bearing sleeves 30 of the involute screw 9 (or preferably together with them) in which case the bearing sleeves are mounted rotatably in the reel frame. As a result, return of the carriage 26 to the operative position after a cast is effected by means of a minor friction moment between the carriage and the guide tube 27 and between the involute screw 9 and the left-hand bearing sleeve 30 in FIG. 1, by intermediary of a spring washer 37 placed under tension between the gear wheel 14 and the adjacent end of this bearing sleeve 30, and by means of the driving force on rotation of the crank for retrieval of the line.

It should, however, be noted that the level-wind mechanism for automatic release and recapture of the line is not dependent upon the special clutch 16 and that it may also be used without any release being realized between the line spool and the level-wind mechanism. In the latter case, the involute screw 9 is driven by the line spool also during cast and the friction will, during the cast, impart to the coupling pin a torque in a direction for swinging away of the carriage 26.

On rotation of the crank 2 for retrieval of the line (the line spool then rotating in the opposite direction to the direction of rotation during the cast) the carriage 26 and level-wind pawl 33 are consequently returned to the operative level-wind position. In order that the pawl 33 securely capture the line when the level-wind mechanism is driven by means of the crank after the completion of a cast, the bar 36 displays, at each end, a broadened end portion 36' which merges in the narrower cylindrical centre portion of the bar via a conical or other suitably shaped transition surface 36" (please see FIG. 5). If not before, the level-wind pawl 33 will, at either end position, securely capture the line because the line, as it is being retrieved, is moved by the pawl 33 via the transition surface 36' towards either end broadened portion 36' of the bar 36, whereafter the pawl 33, on being moved a slight further distance towards either end of the bar 36 before starting its return journey, will force the line to slide into the groove 34.

The possible angle of rotation of the carriage 26 and the guide tube 27 may be restricted by means of cooperating arrest stops between, for example, a projection (not shown), for example at the right-hand end of the guide tube 27 (with respect to FIG. 1) and the frame wall 39.

Instead of utilizing friction between the gear wheel 14 and the bearing sleeve 30 in accordance with the embodiment shown in FIG. 1, by the intermediary of the spring washer 37, it is conceivable to realize the necessary torque on the guide tube 27 for pivoting the carriage 26 by constructing the two intermediate gear wheels 11 and 12 as two separate gear wheels and by disposing the smaller gear wheel 12 such that it is rotatable between opposed abutments in a small angle with respect to the larger gear wheel 10 under a certain bearing friction between the two gear wheels. In such an event, the spring washer 37 may be dispensed with and the bearing body and guide tube may be non-rotatably connected to each other and to the frame. The friction between the involute screw and the coupling pin 29 will then give the necessary torque for returning the carriage 26. Moreover, the coupling pin 29 may possibly co-act with the slot edges of the guide tube for the purposes of providing limit positions for this pivoting movement.

Figures 2, 5:
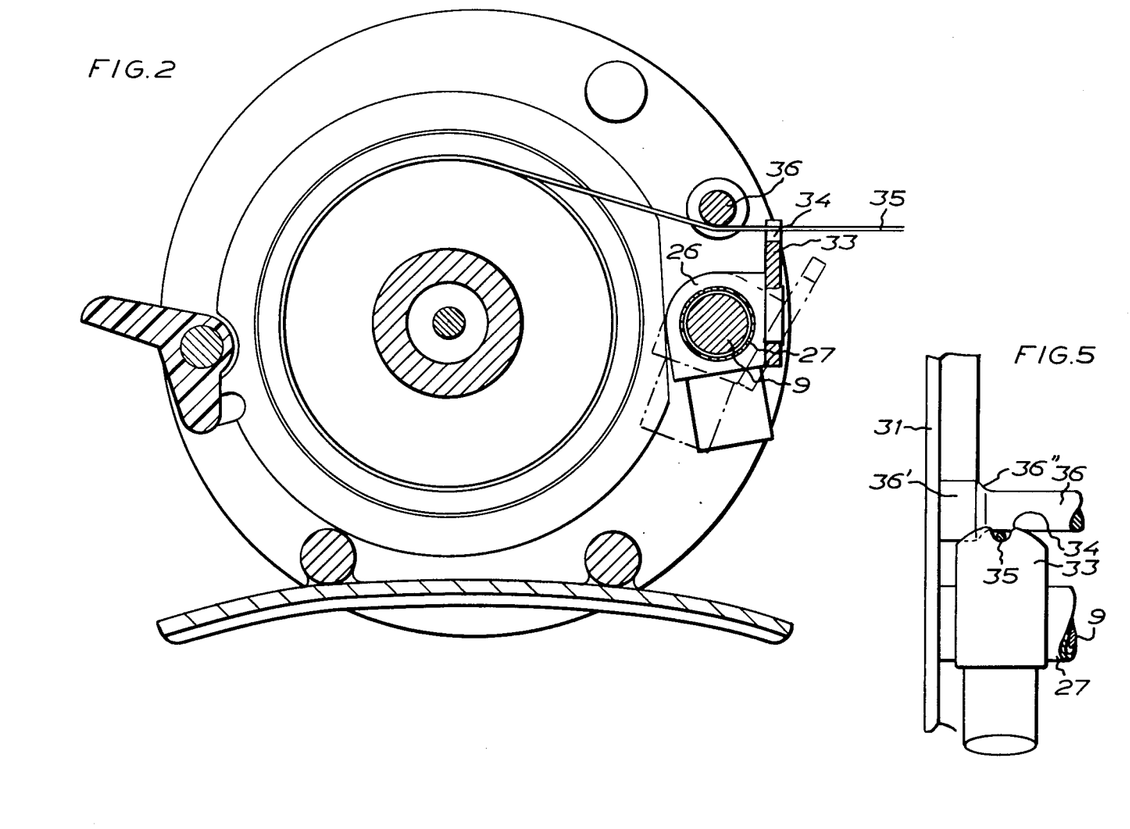
FIG. 2 is a section through the multiplier taken along the line II—II in FIG. 1.
FIG. 5 shows the arrangement of the level-wind in FIG. 4 seen in the direction indicated by means of arrows V—V in FIG. 4.
Figure 6:
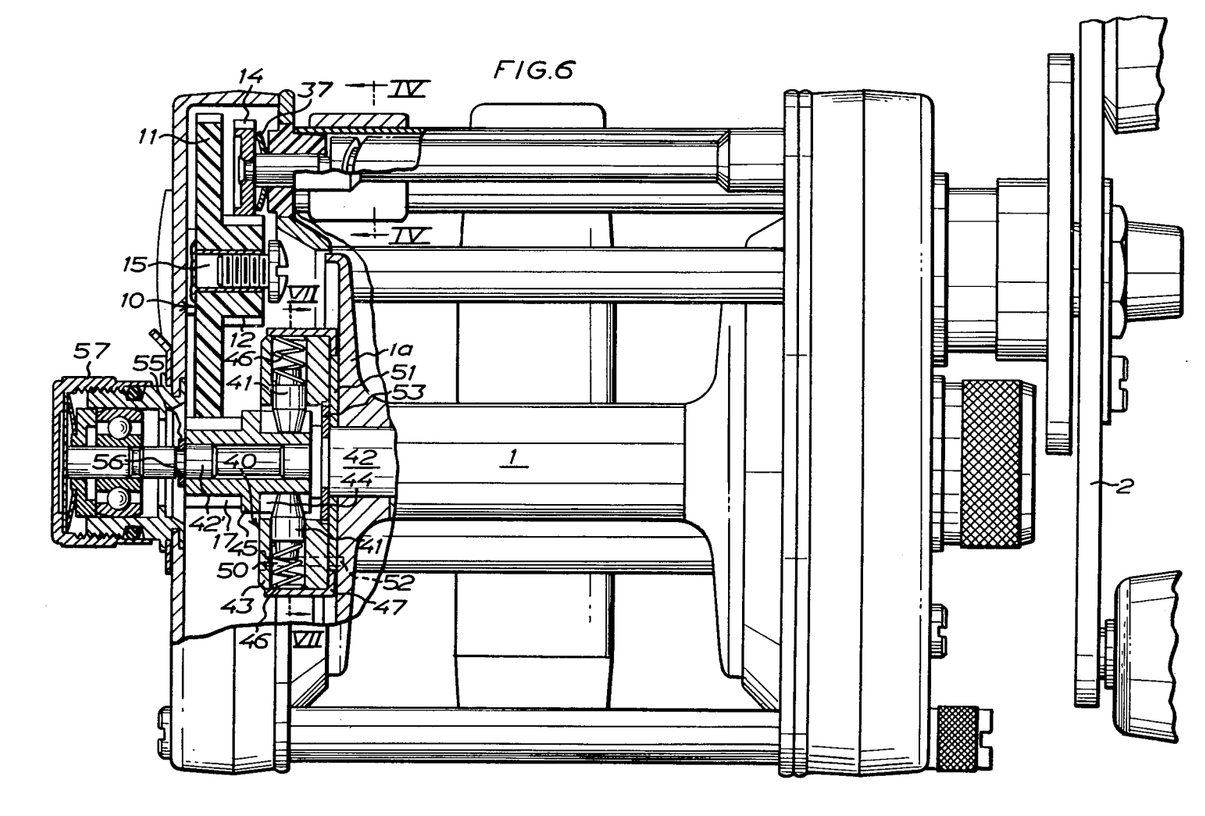
FIG. 6 is a side elevation and partial axial section of a modified embodiment of a multiplier according to the present invention.

The embodiment of FIG. 6 differs from that of FIG. 5 in that the release mechanism 16 has been replaced by a centrifugal clutch.

The gear drive 17, driven by the line spool 1 by the intermediary of the centrifugal clutch generally designated 40 (this drive corresponding to the gear drive 17 in the embodiment of FIG. 1) drives the involute screw 9 via the intermediate gear wheels 10, 11 and the gear wheel 15 fixedly mounted on the involute screw, when the line spool 1 is driven by the crank 2.

The centrifugal clutch 40 consists of a number of weights 41, for example two, which are actuated by centrifugal force. These weights are shiftably guided in a disk 43 connected to the line spool 1 or, where appropriate, with the rotatably journalled shaft 42 of the line spool. In the engaged position, the weights 41 abut in recesses 44 on a sleeve 45 integrally made with the gear drive 17. The sleeve 45 is journalled on an extension 42' of the spool shaft 42. The weights 41 are biased by means of springs 46 in a direction towards the above-mentioned engagement, that is to say in a radial inward direction. The springs 46 are placed under tension between abutments on the weights 41 and a surrounding wall 47. The device works in the following manner.

The centrifugal clutch 40 releases the gear drive 17 included in the level-wind mechanism, in that the weights 41 are shifted radially outwardly from engagement with the sleeve 45 when the spool, during cast, has reached a relatively high speed of rotation, whereby the sleeve 45 with the gear drive 17, as well as the gear wheel set 10, the gear wheel 14 and the level-wind 25, are completely released from the shaft 42 so that the pawl 33 stops. When the speed of rotation then falls below a certain, relatively low speed, the sleeve 45 and gears 17, 10 and 14 are reengaged, the level-wind pawl 33 being also reengaged and recommencing to guide the line for line-laying on the spool. When the level-wind is reengaged, a braking effect occurs which brakes the spool in the final phase of the cast, this counteracting line overrun on the spool.

The above-described embodiment of the centrifugal clutch 40 represents a preferred embodiment according to the invention but may be modified within the spirit and scope of the present invention as regards details. In the illustrated embodiment, the centrifugal weights 41 are in the form of cylindrical bodies whose radial inner ends may be conical in order easily to be returned to engagement in the recess in the gear wheel extension 45. Furthermore, the entire clutch means 40 may easily be dismounted. The gear drive 17 may, for example, easily be dismounted from the shaft 42 without the prior need of radially outwardly shifting the centrifugal weights 41. This is made possible in that the recesses 44 in the sleeve 45 are in the form of grooves which are open at the right-hand end of the sleeve 45 with respect to FIG. 1. The disk 43 may be in the form of a ring of plastics and, as for the simple bores such as the bores (or cast cylindrical cavities) 50, these may be replaced by cavities in sleeve-like inserts, for example of metal, in the annular disk 43. The annular disk 43 may be removably fixed to the spool end wall 1a or to a metal plate 51, connected to the spool end wall 1a, by means of a number of screws 52 of which only one is shown in FIG. 6. The spool shaft 42 may, as is shown in FIG. 6, be axially fixed in relation to the spool end wall or the plate 51 by means of a locking washer 53, whose peripheral edge need not be connected to the annular disk 43 but may serve as an assembly-facilitating centering edge for the disk 43.

It should also be noted that the wall 47, which is illustrated as a flange ring, may be replaced by other sealing members at the radial outer ends of the cavities for the centrifugal weights. If these cavities consist of sleeve-like inserts, they may be sealed at their outer ends.

The gear drive 17 and its sleeve-like extension 45 may be made integrally of plastics, and the intermediate gear wheels 11 and 12 and the gear wheel 14 may also consist of plastics. For axial fixation of the gear wheel 14, a locking washer 55 is disposed in a groove 56 in the shaft 42 between the bearing housing 57 and the gear drive 17.

It will be apparent from the above that the centrifugal clutch 40 according to the invention forms a very compact, easily dismountable unit which may be mounted in most types of multiplier reels after insignificant modifications.

In the use of the release mechanism according to the invention for the level-wind, the following advantages will be gained.

The level-wind is automatically opened forwardly during the cast, the line being completely released. Moreover, the entire level-wind system is released by release of the gear drive 17 on the spool shaft 5.

On retrieval of the line, the level-wind is pivoted back into position and captures the line in one of its extreme positions. The gear ratio of the level-wind may be somewhat higher than normal in order to capture the line as rapidly as possible and thereby lay the line evenly on the spool.

The multiplier may have a fixed spool shaft 5 and a lathe-turned, ball bearing-mounted spool 1, whereby the weight of the spool can be reduced a not inconsiderable degree. This entails that the start surge is reduced in the cast, whereby the casting properties of the reel will be improved.

A further advantage is that the line on the spool will be more easily accessible, for example for unravelling the line on the line spool after a birdsnest, in that the line may be moved away from the level-wind.

The level-wind system may also be used in conventional spool shaft systems in which the line spool is connected to the spool shaft and the spool shaft is journalled in bearings in the frame.

In utilization of the release device according to the invention in multiplier reels with a conventional level-wind mechanism, it may happen in certain cases that the level-wind, at the termination of a cast, stops at one extreme position of the involute screw and that the line, when it is unwound at the opposite end of the line spool with respect to the stop position of the level-wind will thereby display a relatively sharp bend from the level-wind to the line spool. This can cause a braking effect, although this may be neglected in multiplier reels of normal spool width.

However, in multiplier reels with larger spool width (greater shaft length) the line angle from the level-wind to the spool can, in unfavourable circumstances, be so great that the deviation force from the line causes a braking effect of undesirable proportions. This inconvenience is obviated by the use of the above-described device for release of the level-wind from the line during a cast. The release mechanism for the level-wind can then be used irrespective of the width of the spool, since the line, having been released from the level-wind, will not be subjected to any deflection during the cast.

Figure 7:
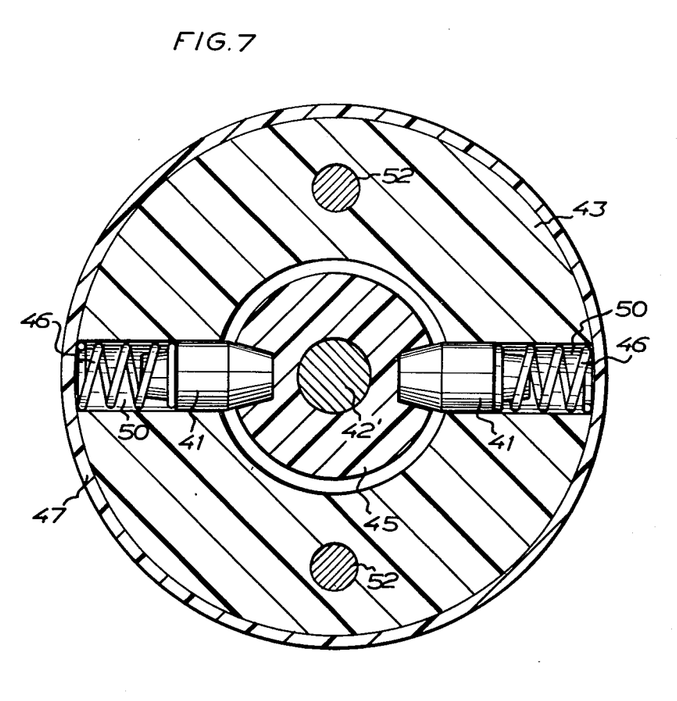
FIG. 7 is a cross-section of the centrifugal clutch taken along the line VII—VII in FIG. 6.

The centrifugal clutch 40 in FIGS. 6 and 7 gives the following particular advantages:

(1) The line spool is released during a cast, so that it, together with its shaft, rotates completely free of other rotary parts (it should, however, be observed that the clutch mechanism 40 may also be used in multipliers in which the shaft, such as the shaft 5 in FIG. 1, is fixedly retained and the spool 1 is rotatably mounted on the shaft);

(2) Application of the mechanical brake with which multipliers are as a rule equipped, may be reduced because of the fact that the level-wind mechanism and its transmission are reengaged and exercise a braking effect in the final phase of the cast;

(3) When the multiplier is used for so-called jigging, the level-wind functions as in conventional multipliers, since the rotation speed in this type of fishing is so low that release does not occur;

(4) The centrifugal clutch 40 can also be used in the majority of multipliers without any appreciable constructional modifications, and may be used in association with conventional, generally well-functioning level-wind mechanisms.

FIGS. 1 and 6 are examples showing that the release mechanism according to the invention is applicable both to multipliers with the line spool rotatably journalled on a fixed spool shaft (FIG. 1) and to multipliers with the line spool fixedly connected to a shaft rotatably journalled in the reel frame (FIG. 5). It should also be noted that it is possible, after minor modifications, to use the one-way clutch in FIG. 1 in a multiplier of the type illustrated in FIG. 6, and to use the centrifugal clutch of FIG. 6 in a multiplier of the type shown in FIG. 1.

The above-described embodiments of the multiplier according to the invention may, naturally, be modified in various ways without departing from the spirit and scope of the appended claims for adaptation to different types of multipliers and for special needs.

What I claim and desire to secure by Letters Patent is:

1. A multiplier fishing reel comprising a frame, a line spool rotatably mounted in said frame, said line spool being rotatable in a first direction by tractive force from the fishing line when the fishing line is paid out from said line spool, a rotatably mounted hand crank in a position outside said frame at one side of said line spool, and first transmission means (3, 4, 6) between said crank and said line spool at said one side thereof for rotating said line spool in the opposite direction for retrieval of the fishing line onto said spool, a level wind mechanism (9, 25) for laying the line on said line spool during retrieval of the line, second transmission means (17, 10, 14) between said line spool at the other side thereof and said level wind mechanism for driving the latter via said line spool when said line spool is rotated by means of said crank, first clutch means (6) in the form of a disengageable clutch means between said first transmission and said line spool for disengaging said line spool from said hand crank when a cast is to be effected, second clutch means (3) in the form of an adjustable frictional clutch means in said first transmission means for permitting rotation of said line spool in relation to said crank in said first direction by an essential tractive force from the fishing line, such as when a fish taking the bait rushes, and an automatically engageable and disengageable third clutch means (16, 40), said third clutch means being independent in relation to said first and second clutch means included in said second transmission means at said other side of said line spool and including cooperating first and second rotatable clutch members, said first clutch member being connected to be rotated by said line spool and said second clutch member being connected to said level wind mechanism, said first and second clutch members being adapted to be connected to each other only when said line spool is driven by said hand crank for connecting said latter with said level wind mechanism via said first transmission, said first and second clutch means, said line spool and said third clutch means; said first and second clutch members of said third clutch means (16, 40) being arranged to be disengaged in relation to each other automatically when said line spool is rotated by tractive force from the fishing line, whereby said level wind mechanism, when said first clutch means is engaged and said line spool is rotated by means of said hand crank, is driven in a normal way through said line spool, whereas said line spool, when said first clutch means is disengaged, is rotatable by the fishing line substantially without transmitting driving force to either said level wind mechanism or to said hand crank, both of which may then be stationary.

2. A multiplier fishing reel as claimed in claim 1, in which said first and second transmission include first and second gear means, said first clutch means being arranged between said first gear means and said line spool at one side of the latter, whereas said third clutch means is arranged between said second gear means and said line spool at the other side thereof.

3. A multiplier fishing reel as claimed in claim 2, in which said third clutch means is in the form of a centrifugal clutch.

4. A multiplier fishing reel as claimed in claim 2, in which said third clutch means is in the form of a one-way coupling.

5. A multiplier fishing reel as claimed in claim 3, in which said first and second clutch members of said third clutch means include coaxially circumferential surfaces, a helical clutch spring means mounted on and surrounding both of said coaxial surfaces and arranged to be contracted only when said first clutch member is rotated in one direction driven by said hand crank via said first transmission and line spool for transferring drive force from said first to said second clutch member for driving said level wind mechanism (9, 25) via said second transmission, said helical clutch spring means being arranged to be expanded and to disconnect said first and second clutch members from each other, when said first clutch member is rotated in the opposite direction driven by the fishing line via said line spool, for permitting said line spool to rotate freely in the direction for paying out the fishing line without transferring drive forces to said level wind mechanism (9, 25).

6. A multiplier fishing reel as claimed in claim 5, in which said first clutch member is releasably interconnected to said line spool at one end thereof, and in which said second transmission means includes a gear wheel which is formed integrally with said second clutch member.

7. A multiplier fishing reel as claimed in claim 3, in which said centrifugal clutch (40) includes a first clutch member rotatably connected to said line spool, a second clutch member connected to said second transmission, clutch weights (41) movably supported by said first clutch member to be displaced by centrifugal force when said first clutch member is rotated, spring means for biasing said clutch weights into coupling engagement with said second clutch member, said clutch weights being arranged, by centrifugal force when said line spool (1) is rotated above a certain speed, to be displaced radially outwardly against the action of said spring means from said engagement with said second clutch member for disengaging said first and second clutch members from each other and thereby disengaging said line spool from said level-wind mechanism (9, 25).

8. A fishing reel as claimed in claim 6, in which said first clutch member of said centrifugal clutch has the form of a housing for said clutch weights and for said spring means, said housing being ring-shaped and having a central hub for receiving said second clutch member, and said hub having openings to permit said clutch weights to enter into clutch engagement with said second clutch member.

9. A multiplier fishing reel comprising a frame, a line spool rotatably mounted on said frame, said line spool being rotatable in a first direction by tractive force from the fishing line for paying out the fishing line from said line spool, a rotatably mounted hand crank in a position outside said frame at one side of said line spool, and transmission means (3,4,6) for rotating said line spool in the opposite direction for retrieval of the fishing line onto said spool, a level wind mechanism (9,25) driven by said hand crank and transmission for laying the line on said line spool when the line spool is driven for the retrieval of the line, first clutch means (6) in the form of disengageable clutch means in said transmission means for disengaging said line spool from said hand crank when a cast is to be effected, second clutch means (3) in the form of an adjustable frictional clutch means in said transmission means for permitting rotation of said line spool in relation to said crank in said first direction by an essential tractive force from the fishing line, such as when a fish taking the bait rushes, and an automatically engageable and disengageable third clutch means (16,40), said third clutch means being independent in relation to said first and second clutch means included in said transmission means and comprising cooperating first and second rotatable clutch members, said first clutch member being connected to be rotated by said line spool and said second clutch member being connected to said level wind mechanism, said first and second clutch members being adapted to be connected to each other automatically when said line spool is driven by said hand crank, said third clutch means including coaxially circumferential surfaces on said first and second clutch members and a helical clutch spring means mounted on and surrounding both of said coaxial surfaces and arranged to be contracted by rotation of said first clutch member in one direction driven by said hand crank via said transmission means and said line spool for retrieval of the fishing line on the line spool and for transferring drive force for driving said level wind mechanism (9,25) via said transmission means, said helical clutch spring means being arranged to be re-expanded and thereby to disconnect said first and second clutch members from each other, when said first clutch member is rotated in the opposite direction driven by the fishing line via said line spool, for permitting said line spool to rotate freely for paying out the fishing line without transferrin drive forces to said level wind mechanism (9,25).

* * * * *